US012325024B2

(12) United States Patent
Wang et al.

(10) Patent No.: US 12,325,024 B2
(45) Date of Patent: Jun. 10, 2025

(54) DEVICE FOR REAGENT STORAGE AND RELEASE, AND MICROFLUIDIC DEVICE

(71) Applicant: BOE Technology Group Co., Ltd., Beijing (CN)

(72) Inventors: Chenyu Wang, Beijing (CN); Yufan Zhang, Beijing (CN); Jing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 153 days.

(21) Appl. No.: 17/769,068

(22) PCT Filed: Jun. 15, 2021

(86) PCT No.: PCT/CN2021/100097
§ 371 (c)(1),
(2) Date: Apr. 14, 2022

(87) PCT Pub. No.: WO2021/254323
PCT Pub. Date: Dec. 23, 2021

(65) Prior Publication Data
US 2024/0100529 A1 Mar. 28, 2024

(30) Foreign Application Priority Data
Jun. 17, 2020 (CN) ......................... 202010555217.4

(51) Int. Cl.
*B01L 3/00* (2006.01)

(52) U.S. Cl.
CPC ....... *B01L 3/523* (2013.01); *B01L 2200/0689* (2013.01); *B01L 2200/16* (2013.01);
(Continued)

(58) Field of Classification Search
CPC ............. B01L 3/523; B01L 2200/0689; B01L 2200/16; B01L 2300/044;
(Continued)

(56) References Cited

U.S. PATENT DOCUMENTS 5,826,713 A 10/1998 Sunago et al.
8,703,070 B1 * 4/2014 Parng ................ B01L 3/502738 436/805

(Continued)

FOREIGN PATENT DOCUMENTS

CN 101262948 A 9/2008
CN 103133301 A 6/2013

(Continued)

OTHER PUBLICATIONS

CN202010555217.4 first office action.
CN202010555217.4 Notification to grant patent right for invention.

*Primary Examiner* — Jennifer Wecker
*Assistant Examiner* — Britney N. Washington
(74) *Attorney, Agent, or Firm* — IPro, PLLC

(57) ABSTRACT

A device for reagent storage and release includes a body portion and a liquid reservoir portion, wherein the body portion includes a puncturing portion and an accommodation portion that matches the puncturing portion, wherein the accommodating portion is provided with an accommodating groove, and the puncturing portion is configured to puncture the liquid reservoir portion and be received within the accommodating groove. A microfluidic device is also provided.

20 Claims, 4 Drawing Sheets

(52) U.S. Cl.
CPC . *B01L 2300/044* (2013.01); *B01L 2300/0672* (2013.01); *B01L 2300/123* (2013.01)

(58) Field of Classification Search
CPC ....... B01L 2300/0672; B01L 2300/123; B01L 2400/0478; B01L 3/502715; B01L 3/5027; B01L 2300/12
See application file for complete search history.

(56) References Cited

U.S. PATENT DOCUMENTS

| | | | | |
|---|---|---|---|---|
| 2006/0235335 | A1* | 10/2006 | Elsenhans | B29C 45/1676 600/577 |
| 2011/0319279 | A1 | 12/2011 | Montagu et al. | |
| 2012/0027648 | A1 | 2/2012 | Samper et al. | |
| 2016/0265022 | A1* | 9/2016 | Yang-Woytowitz | A61J 1/1418 |
| 2017/0191912 | A1 | 7/2017 | Astier et al. | |
| 2019/0022637 | A1* | 1/2019 | Lafferty | B01L 3/5027 |
| 2020/0164367 | A1 | 5/2020 | Wunsch et al. | |
| 2021/0322980 | A1* | 10/2021 | Wang | B01L 3/502715 |

FOREIGN PATENT DOCUMENTS

| | | | |
|---|---|---|---|
| CN | 103376312 | A | 10/2013 |
| CN | 203685874 | U | 7/2014 |
| CN | 204694169 | U | 10/2015 |
| CN | 108430635 | A | 8/2018 |
| CN | 109999931 | A | 7/2019 |
| CN | 110252434 | A | 9/2019 |
| CN | 110508338 | A | 11/2019 |
| CN | 209590045 | U | 11/2019 |
| CN | 209624608 | U | 11/2019 |
| CN | 210009980 | U | 2/2020 |
| CN | 210222045 | U | 3/2020 |
| CN | 111024768 | A | 4/2020 |
| CN | 210585000 | U | 5/2020 |
| CN | 210613738 | U | 5/2020 |
| EP | 2943278 | B1 | 2/2019 |
| WO | 9613241 | A1 | 5/1996 |
| WO | 2007125468 | A2 | 11/2007 |
| WO | 2009152952 | A1 | 12/2009 |

* cited by examiner

DEVICE FOR REAGENT STORAGE AND RELEASE, AND MICROFLUIDIC DEVICE

CROSS-REFERENCE TO RELATED APPLICATION

This application is a US national stage of international application No. PCT/CN2021/100097, filed on Jun. 15, 2021, which claims priority to Chinese Patent Application No. 202010555217.4, filed on Jun. 17, 2020, and entitled "DEVICE FOR REAGENT STORAGE AND RELEASE AND MICROFLUIDIC DEVICE," the disclosures of which are herein incorporated by reference in their entireties.

TECHNICAL FIELD

The present disclosure relates to a device for reagent storage and release and a microfluidic device.

BACKGROUND

Microfluidics is a technique for precisely controlling and manipulating micro-scale fluids, which may integrate basic operation units during the testing and analyzing process, such as sampling, reaction, separation, detection, and the like, onto a micro/nano-scale chip, and automatically complete the analyzing process. Microfluidic technology has the advantage of less sample consumption, faster detection speed, ease of operation, multifunctional integration, small volume, and ease of carrying, with great application prospects in the field of biological, chemical, medical, and the like.

SUMMARY

In one aspect, the present disclosure provides a device for reagent storage and release. The device includes a body portion and a liquid reservoir portion, wherein the body portion comprises a puncturing portion and an accommodating portion that matches the puncturing portion, wherein the accommodating portion is provided with an accommodating groove, and the puncturing portion is configured to puncture the liquid reservoir portion and be received within the accommodating groove.

In some embodiments, the puncturing portion comprises a head portion and a needle tip portion, the needle tip portion being at a first end of the head portion.

In some embodiments, the puncturing portion further comprises a push rod at a second end of the head portion, the second end of the head portion being opposite to the first end of the head portion.

In some embodiments, the head portion is a tapered post, and a diameter of the first end of the head portion is smaller than a diameter of the second end of the head portion.

In some embodiments, the accommodating portion is provided with a liquid outlet and a liquid outlet channel, wherein the liquid outlet is at a bottom of the accommodating groove and is configured to communicate the liquid outlet channel with the accommodating groove.

In some embodiments, an inner diameter of the liquid outlet is greater than a radial dimension of the needle tip portion.

In some embodiments, the liquid reservoir portion is connected to the accommodating portion via a first connecting structure.

In some embodiments, the first connection structure comprises an adhesive.

In some embodiments, the liquid reservoir portion comprises a liquid reservoir body, an elastic film, a first thin film, and a second thin film; wherein the liquid reservoir body is annular, the first thin film is at one end of the liquid reservoir body, the second thin film is at the other end of the liquid reservoir body, and an enclosed liquid reservoir space is formed by an inner sidewall of the liquid reservoir body, the first thin film, and the second thin film; and the elastic film is disposed on one side, distal from the second thin film, of the first thin film and is connected to the liquid reservoir body.

In some embodiments, an inner diameter of the liquid reservoir body is equal to an inner diameter of an opening of the accommodating groove.

In some embodiments, the elastic film is connected to the liquid reservoir body via a second connecting structure.

In some embodiments, the second connecting structure comprises a cover plate, wherein the cover plate is annular, disposed on one side, distal from the liquid reservoir body, of the elastic film, and is connected to the liquid reservoir body via a fastener, and the elastic film is sandwiched between the cover plate and the liquid reservoir body.

In some embodiments, the elastic film is a silicone film.

In some embodiments, the first thin film and the second thin film are both a composite film of polystyrene and aluminum.

In another aspect, the present disclosure also provides a microfluidic device including any of the devices for reagent storage and release described in the previous aspect.

BRIEF DESCRIPTION OF THE DRAWINGS

To describe the embodiments of the present disclosure or the technical solutions in the prior art more clearly, the following briefly introduces the accompanying drawings required for describing the embodiments or the descriptions in the prior art. Apparently, the accompanying drawings in the following description show merely some embodiments of the present disclosure, and a person of ordinary skill in the art may still derive other drawings from these accompanying drawings without creative efforts.

REFERENCE NUMERALS

1—body portion; 11—puncturing portion; 111—head portion; 112—needle tip portion; 113—push rod; 12—accommodating portion; 121—base portion;

122—accommodating groove; 123—liquid outlet; 2—liquid reservoir portion; 21—liquid reservoir body; 22—elastic film; 23—first thin film; 24—second thin film; 3—first connecting structure; 4—second connecting structure; 41—cover plate; 42—fastener.

DETAILED DESCRIPTION

For clearly illustrating the objects, technical solutions, and advantages of embodiments of the present disclosure, the technical solutions in the embodiments of the present disclosure are completely and clearly described hereinafter with reference to the accompanying drawings of embodiments of the disclosure. It is obvious that the described embodiments are merely part of, but not all embodiments of, the present disclosure. Based on the described embodiments of the disclosure, other embodiments that may be obtained by a person of ordinary skill in the art without creative effort are all within the scope of the disclosure.

Unless otherwise defined, technical or scientific terms used herein should be of the ordinary meaning as understood by one of ordinary skill in the art to which the present disclosure belongs. The terms "first." "second." and the like in the present disclosure do not indicate any sequence, quantity, or importance, but rather are used to distinguish different components. The terms "including" or "comprising" or the like mean that an element or object appearing in front of the term covers an element or object appearing behind the term and equivalents thereof without excluding other elements or objects. Terms "connected" or "connecting." or the like, are not limited to physical or mechanical connections, but may include direct or indirect electrical connections. "Above," "below," "left," "right," and the like are merely used to indicate relative positional relationships, which may also be changed accordingly in the case that the absolute position of the object being described is changed.

For keeping the following description of the embodiments of the present disclosure clear and concise, the present disclosure omits detailed descriptions of known functions and known components.

The first embodiment of the present disclosure provides a device for reagent storage and release that can be applied in microfluidic chips, of course, in other devices that employ microfluidic technology. The device is primarily used to quantitatively store and release a liquid reagent in microfluidic technology.

Figure 1:
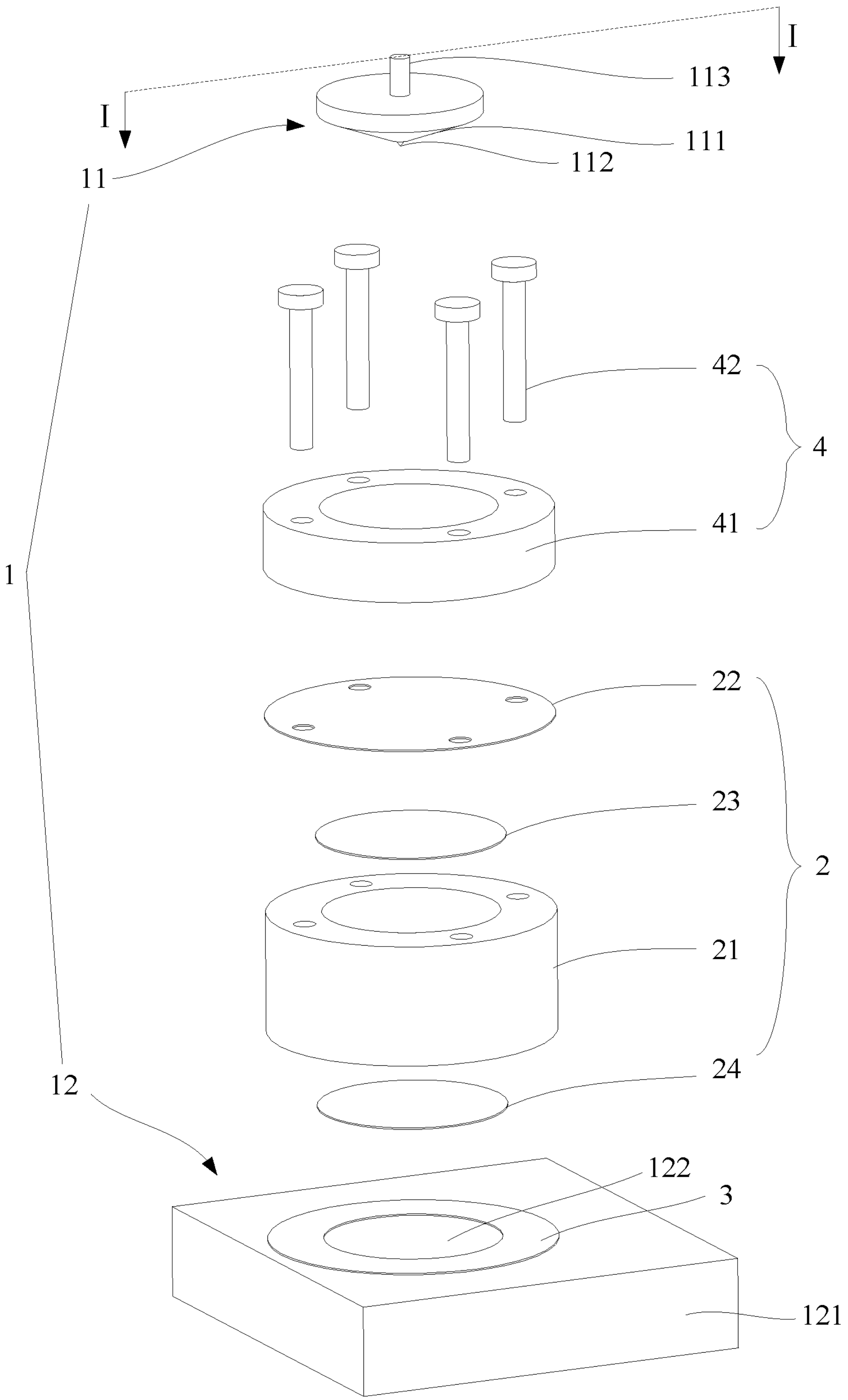
FIG. 1 is an exploded view of a device for reagent storage and release according to an embodiment of the present disclosure.
Figure 2:
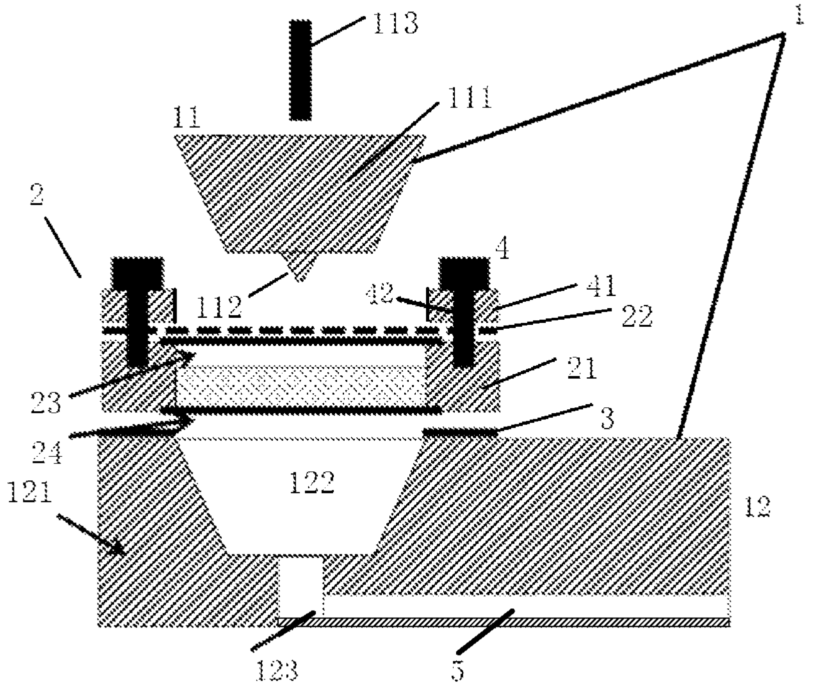
FIG. 2 is a cross-sectional view of a device for reagent storage and release according to an embodiment of the present disclosure.

FIG. 1 is an exploded view of a device for reagent storage and release according to an embodiment of the present disclosure. FIG. 2 is a cross-sectional view of the device for reagent storage and release according to an embodiment of the present disclosure. The cross-section shown in FIG. 2 is the I-I cross-section of the device in the case that the device is assembled. It is noted that the drawings are only for illustration and not to scale. As shown in FIGS. 1 and 2, the device for liquid reagent storage and release according to an embodiment of the present disclosure includes a body portion 1 and a liquid reservoir portion 2.

The liquid reservoir portion 2 is configured to store a liquid reagent. The maximum capacity of the liquid reservoir portion 2 for storing the liquid reagent may be determined as needed. For example, in this embodiment, the maximum capacity of the liquid reservoir portion 2 for storing the liquid reagent is 300 microliters. The body portion 1 is a core part for releasing the liquid reagent stored in the liquid reservoir portion 2. In the case that the present device is employed in a microfluidic device, the body portion 1 may be a main part of a microfluidic chip or the microfluidic device. The dimensions of the liquid reservoir portion 2 and the body portion 1 may be cooperatively designed and manufactured, such that the liquid reservoir portion 2 and the body portion 1 may form a complete set and be modularly manufactured. In particular, liquid reservoir portions 2 with different capacities or for storing different types of liquid reagents may be flexibly assembled with the body portion 1, to suit different scenarios or to meet different needs. It is only needed to change different liquid reservoir portions 2 in use.

As shown in FIG. 2, the body portion 1 includes a puncturing portion 11 and an accommodating portion 12 that matches the puncturing portion 11. The accommodating portion 12 is provided with an accommodating groove 122. The puncturing portion 11 is configured to puncture the liquid reservoir portion 2 and be received in the accommodating groove 122.

The body portion 1 may release the liquid reagent stored in the liquid reservoir portion 2. In the case that the liquid reagent is practically needed to be released, the liquid reservoir portion 2 is placed between the puncturing portion 11 and the accommodating portion 12, the puncturing portion 11 passes through and punctures the liquid reservoir portion 2, and then is received in the accommodating portion 12 upon puncturing the liquid reservoir portion 2. After the liquid reservoir portion 2 is punctured, the liquid reagent in the liquid reservoir portion 2 flows into the accommodating portion 12, thereby achieving the release of the liquid reagent.

As shown in FIG. 2, the puncturing portion 11 includes a head portion 111 and a needle tip portion 112, wherein the head portion 111 includes a first end and a second end that are opposite from the first end. The first end is an end, proximal to the liquid reservoir portion 2, of the head portion 111, and the second end is the end, distal from the liquid reservoir portion 2, of the head portion 111. The needle tip portion 112 is at the first end of the head portion 111. The needle tip portion 112 can facilitate the puncturing portion 11 passing through and puncturing the liquid reservoir portion 2, and is ultimately received in the accommodating portion 12.

Exemplarily, the needle tip portion 112 may be conical or pyramidical, so as to provide a sharp tip for facilitating the needle tip portion 112 puncturing the liquid reservoir portion 2.

As shown in FIG. 2, the head portion 111 and the needle tip portion 112 are coaxially arranged, such that the needle tip portion 112 can puncture the liquid reservoir portion 2 from a middle portion of the liquid reservoir portion 2.

As shown in FIG. 2, the puncturing portion 11 further includes a push rod 113. The push rod 113 is at the second end of the head portion 111. The push rod 113 can facilitate a connection of the puncturing portion 11 to an external mechanical device, such that the needle tip portion 112 is capable of puncturing the liquid reservoir portion 2 under an applied external force. In the case that the external force is applied to the push rod 113, the head portion 111 is pushed to move toward the liquid reservoir portion 2, thereby causing the needle tip portion 112 to puncture the liquid reservoir portion 2 to release the liquid reagent in the liquid reservoir portion 2. In addition, the push rod 113 may also be pushed directly by a hand, to make the needle tip portion 112 puncture the liquid reservoir portion 2 without connecting the push rod 113 to the mechanical device providing a pushing force.

As shown in FIG. 2, the head portion 111, the needle tip portion 112, and the push rod 113 may be coaxially arranged, such that when pushing the push rod 113, the puncturing portion 11 is more stable, and the force is transferred from the push rod 113 to the head portion 111 and then to the needle tip portion 112.

Optionally, the puncturing portion 11 is an integrally formed structure. That is, the head portion 111, the needle tip portion 112, and the push rod 113 form an integral structure. The integrally formed structure has large strength and a low cost.

Optionally, the puncturing portion 11 may be a metal piece, a plastic piece, a ceramic piece, or the like. The metal pieces have a longer life, and the plastic pieces and the ceramic pieces are easy to form and are less costly.

To ensure that the puncturing portion 11 can apply a greater force to the liquid reservoir portion 2 and more easily puncture the liquid reservoir portion 2, the head portion 111 may be shaped with a tapered structure.

Exemplarily, the head portion 111 is a tapered post, wherein a diameter of the first end of the head portion 111 is smaller than a diameter of the second end of the head portion 111. In the embodiment of the present disclosure, the diameter of the second end of the head portion 111 is 15.8 mm, the diameter of the first end is 1.8 mm, and the height is 4 mm.

In some examples, the needle tip portion 112 at the first end of the head portion 111 is a cone, wherein a diameter of an end, proximal to the head portion 111, of the needle tip portion 112 is 1 mm, and a height of the needle tip portion 112 is 1 mm. The needle tip portion 112 is disposed at a first end with a smaller diameter of the head portion 111, and a tip of the needle tip portion 112 is configured to apply the puncturing force to the liquid reservoir portion 2.

In other examples, the needle tip portion 112 may also be with a shape of a pyramid or with other shapes that facilitate puncturing the liquid reservoir portion 2.

Figure 3:
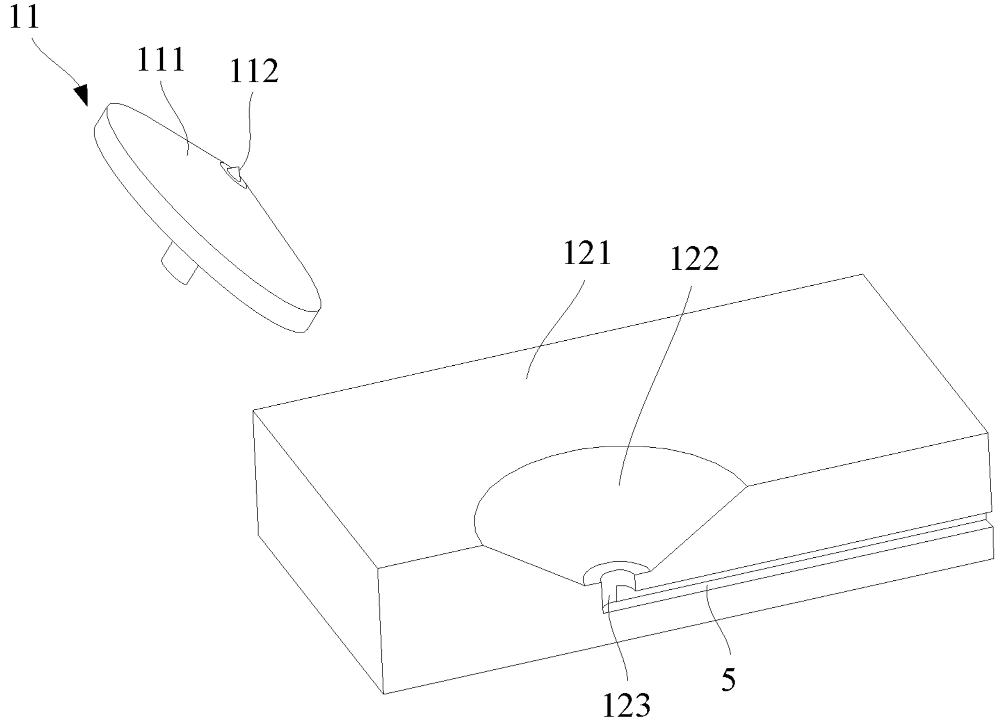
FIG. 3 is a schematic structural view of a puncturing portion and an accommodating groove in a device for liquid reagent storage and release according to an embodiment of the present disclosure.

As shown in FIG. 2, the accommodating portion 12 includes a base portion 121, and the accommodating groove 122 is on one side of the base portion 121. FIG. 3 is a structural schematic view of the puncturing portion and the accommodating groove in the device for liquid reagent storage and release according to an embodiment of the present disclosure. As shown in FIG. 3, for facilitating the puncturing portion 11 being received in the accommodating groove 122, the accommodating groove 122 matches the head portion 111 of the puncturing portion 11, wherein the matching here refers to that the shape of the accommodating groove 122 matches the shape of the head portion 111 of the puncturing portion 11, and the head portion 111 can be received into the accommodating groove 122, such that the liquid reagent in the liquid reservoir portion 2 may be all expelled under the squeezing action of the head portion 111.

In the embodiment of the present disclosure, a diameter of an opening of the accommodating groove 122 is 16 mm, a diameter of a bottom of the accommodating groove 122 is 2 mm, and the depth of the accommodating groove 122 is 4 mm. The diameter of the opening of the accommodating groove 122 is larger than the diameter of the second end of the head portion 111 and the diameter of the bottom of the accommodating groove 122 is larger than the diameter of the first end of the head portion 111, which ensure that the head portion 111 can be received into the receiving accommodating groove 122.

As shown in FIG. 2, the accommodating portion 12 is provided with a liquid outlet 123 and a liquid outlet channel 5 therein. The liquid outlet 123 is at the bottom of the accommodating groove 122 and is configured to communicate the liquid outlet channel 5 with the accommodating groove 122. One end of the liquid outlet 123 is in communication with the bottom of the accommodating groove 122 and the other end of the liquid outlet 123 is in communication with the liquid outlet channel 5. In the case that the needle tip portion 112 of the puncturing portion 11 punctures the liquid reservoir portion 2, the liquid reagent in the liquid reservoir portion 2 flows into the accommodating groove 122. In the case that the puncturing portion 11 is received in the accommodating groove 122, under the squeezing action of the head portion 111 of the puncturing portion 11, the liquid reagent is delivered to the liquid outlet channel 5 through the liquid outlet 123, which achieves the quantitative release of the liquid reagent.

Optionally, the needle tip portion 112 has a radial dimension smaller than an inner diameter of the liquid outlet 123, such that the needle tip portion 112 can be received into the liquid outlet 123 and the liquid reagent can be completely squeezed into the liquid outlet 123.

Illustratively, the liquid outlet 123 is formed with an inner diameter of 1.5 mm, such that not only the head portion 111 can be completely received in the accommodating groove 122, but also the needle tip portion 112 can be accommodated in the liquid outlet 123 without blocking the liquid outlet 123, which ensure that all of the liquid reagent can be expelled successfully.

In addition, to stably fix the liquid reservoir portion 2 on the accommodating portion 12 to allow the puncturing portion 11 to puncture the liquid reservoir portion 2, the liquid reservoir portion 2 is connected to the accommodating portion 12 via a first connecting structure 3. Prior to the release of the liquid reagent, the liquid reservoir portion 2 is connected to the accommodating portion 12 and corresponds to the accommodating groove 122.

Optionally, the first connecting structure 3 includes an adhesive. Illustratively, at the surface of the base portion 121 of the accommodating portion 12, a bonding area is provided around the location of the accommodating groove 122, and the bottom of the liquid reservoir portion 2 is bonded to the surface of the accommodating portion 12 by the adhesive, which can facilitate not only the fixing of the liquid reservoir portion 2, but also the replacement of different liquid reservoir portions 2. The adhesive may be disposed on the surface of the base portion 121 or may be disposed on the surface of the liquid reservoir portion 2. The adhesive may be double-faced.

As shown in FIG. 2, the liquid reservoir portion 2 is configured to contain a quantity of liquid reagent, and the liquid reservoir portion 2 includes a liquid reservoir body 21, an elastic film 22, a first thin film 23, and a second thin film 24.

The liquid reservoir body 21 is annular, the first thin film 23 is at one end of the liquid reservoir body 21, and the second thin film 24 is at the other end of the liquid reservoir body 21. An enclosed reservoir space is formed by an inner sidewall of the liquid reservoir body 21, the first thin film 23, and the second thin film 24. The elastic film 22 is disposed on one side, distal from the second thin film 24, of the first thin film 23, and the elastic film 22 is connected to the liquid reservoir body 21.

The first thin film 23 and the second thin film 24 are used to seal the liquid reagent in the liquid reservoir body 21. When releasing the liquid reagent, the first thin film 23 and the second thin film 24 may rupture under the action of the puncturing portion 11, so that the liquid reagent is released from the liquid reservoir body 21. The elastic film 22 may deform without rupture under the action of the puncturing portion 11, which can prevent the liquid reagent from leaking from one side of the first thin film 23 and prevent the puncturing portion 11 to the liquid reagent.

Illustratively, an inner diameter of the liquid reservoir body 21 is equal to the inner diameter of the opening of the accommodating groove 122. For example, both the inner diameter of the liquid reservoir body 21 and the inner diameter of the opening of the accommodating groove 122 may be set to 16 mm, and the height of the liquid reservoir body 21 is set to 4 mm.

The first thin film 23 and the second thin film 24 can be selected as films easily punctured, so that, in the state that the liquid reagent is not released, the liquid reagent is stored in the liquid reservoir space, and in the state of that the liquid reagent is needed to be released, the needle tip portion 112 can puncture the first thin film 23 and the second thin film 24 to achieve the release of the liquid reagent.

Optionally, the first thin film 23 and the second thin film 24 are both a composite film of polystyrene (PS) and aluminum (Al). The composite film of PS and Al is easy to be punctured and does not form crumbs after being punctured, such that the contamination of the liquid reagent and the clogging of the liquid outlet 123 and liquid outlet channel 5 are avoided.

Illustratively, the thickness of the first thin film 23 and the second thin film 24 may be 0.04 mm. The thicknesses of the first thin film 23 and the second thin film 24 affect the release of the liquid reagent. The first thin film 23 and the second thin film 24 may be too thick to be easily punctured, or too thin to achieve a good protective effect for the liquid reagent resulting in the films spontaneously rupturing and causing a leak of the liquid reagent.

When releasing the liquid reagent in the liquid reservoir portion 2, the elastic film 22 functions to cooperatively discharge all of the liquid reagent. Therefore, the elastic film 22 is disposed on the first thin film 23 and adhered to the first thin film 23. In the case that the liquid reservoir portion 2 is stabbed by the needle tip portion 112, the needle tip portion 112 does not puncture the elastic film 22. The elastic film 22 deforms with the movement of the needle tip portion 112, which allows the needle tip portion 112 to sequentially puncture the first thin film 23 and the second thin film 24, and expel the liquid reagent in the liquid reservoir space under the action of elastic film 22.

Optionally, the elastic film 22 is a silicone film. The silicone film has higher elasticity and can not be punctured.

Illustratively, the thickness of silicone film may be 0.1 mm. In the case that the thickness of silicone film is excessively large, the elastic film 22 is hard to produce sufficient deformations and the cost is higher. In the case that the thickness of the silicone film is too small, the elastic film 22 is likely to rupture under the action of the needle tip portion 112.

Optionally, the first thin film 23 and the second thin film 24 are bonded to the liquid reservoir body 21. The way of bonding is used to facilitate fabrication and has a low cost.

In some examples, the first thin film 23 and the second thin film 24 may also be connected to the liquid reservoir body 21 by a sealing machine, such as a heat sealing machine, an electromagnetic induction sealing machine, or the like.

As shown in FIG. 2, the elastic film 22 is connected to the liquid reservoir body 21 via a second connecting structure 4. The elastic film 22 is fixed via the second connecting structure 4, such that the elastic film 22 is capable of deforming with the movement of the needle tip portion 112 and not detaching from the liquid reservoir body 21.

In some examples, the second connecting structure 4 includes a cover plate 41 being annular. The cover plate 41 is disposed on one side, distal from the liquid reservoir body 21, of the elastic film 22, and the cover plate 41 is connected to the liquid reservoir body 21 via a fastener 42. The elastic film 22 is sandwiched between the cover plate 41 and the liquid reservoir body 21. The cover plate 41 compresses an edge of the elastic film 22 against the surface of the liquid reservoir body 21, the middle portion of the elastic film 22 covers the first thin film 23, and the elastic film 22 is elastically deformable under the action of the puncturing portion 11 when releasing the liquid reagent.

Illustratively, the fastener 42 is a screw.

Referring to FIG. 1, the cover plate 41 is provided with a plurality of through-holes, the end of the liquid reservoir body 21 is provided with a plurality of connecting holes corresponding to the plurality of through-holes, wherein the connecting holes may be threaded holes, and the rim of the elastic film 22 is also provided with a plurality of through-holes.

During the connection process, the elastic film 22 is disposed at the end of the liquid reservoir body 21. By adjusting the elastic film 22, the through-holes on the elastic film 22 are aligned with the connecting holes at the end of the liquid reservoir body 21. The cover plate 41 is then disposed on the elastic film 22 and the position of the cover plate 41 is adjusted to make the through holes on the cover plate 41 align with the through-holes on the elastic film 22. Then, the screw is sequentially passing through the through-hole on the cover plate 41, the through-hole on the elastic film 22, inserted into the connecting hole at the end of the liquid reservoir body 21, and tightened, such that the elastic film 22 is clamped between the cover plate 41 and the liquid reservoir body 21.

As an example, in the embodiment of the present disclosure, the number of the through-holes on the cover plate 41, the number of the through-holes on the elastic film 22, and the number of the connecting holes at the end of the liquid reservoir body 21 are all four, and therefore 4 screws are used for the connection. In other embodiments, the number of the through-holes on the cover plate 41, the number of the through-holes on the elastic film 22, and the number of the connecting holes at the end of the liquid reservoir body 21 can also be 3, 5, 6, or more. The through-holes on the cover plate 41, the through-holes on the elastic film 22, or the connecting holes at the end of the liquid reservoir body 21 are evenly spaced along the circumference of the second connecting structure 4 to make the second connecting structure more secure.

Figure 4:
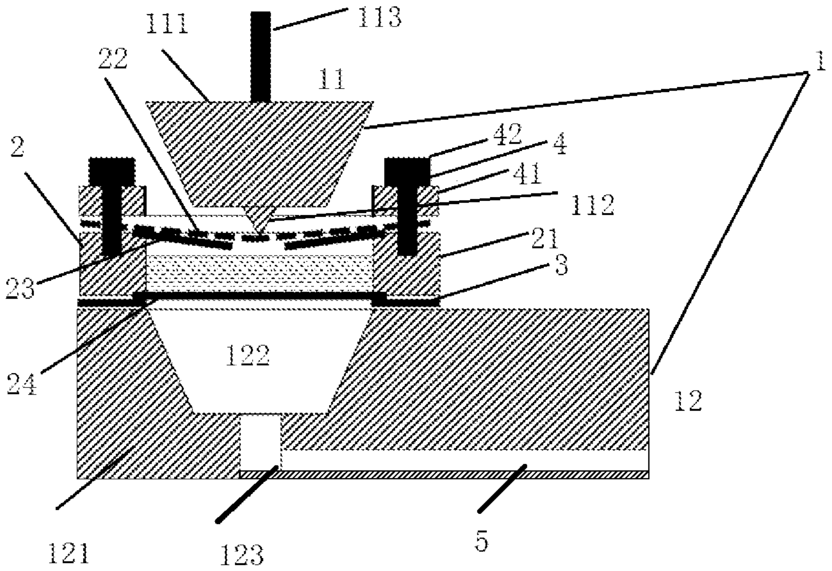
FIG. 4 is a schematic view of a using process of a device for liquid reagent storage and release according to an embodiment of the present disclosure.

By way of example below, a using method of the device for reagent storage and release provided by embodiments of the present disclosure is briefly described in conjunction with FIGS. 4-6.

Process 1: a liquid reservoir portion 2 is selected, such as a liquid reservoir portion 2 in which 300 microliters of liquid reagent are pre-stored. The liquid reservoir portion 2 may be selected depending on a specific usage scenario.

Process 2: the liquid reservoir portion 2 is placed at a position, corresponding to the accommodating groove 122, on the accommodating portion 12.

Process 3: a specific force is applied to the push rod 113 by an external mechanical device, such that the push rod 113 pushes the head portion 111 to move forward, or a push force may also be applied directly by a hand to the push rod 113 to push the head portion 111. As shown in FIG. 4, upon the needle tip portion 112 contacting the elastic film 22, the needle tip portion 112 continues to move forward and causes the elastic film 22 to deform, and then the needle tip portion 112 punctures the first thin film 23.

Figure 5:
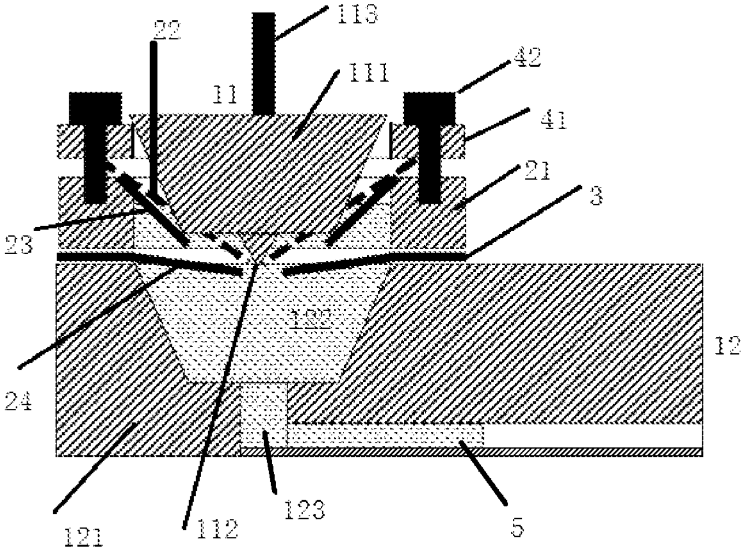
FIG. 5 is a schematic view of a using process of a device for liquid reagent storage and release according to an embodiment of the present disclosure.

Process 4: as shown in FIG. 5, the head portion 111 is pushed continually, causing the needle tip portion 112 to continue to move in the case that the first thin film 23 is punctured, thereby puncturing the second thin film 24.

In the case that the second thin film 24 is punctured, the liquid reagent stored in the liquid reservoir body 21 is released into the accommodating groove 122 under the squeezing of head portion 111.

Figure 6:
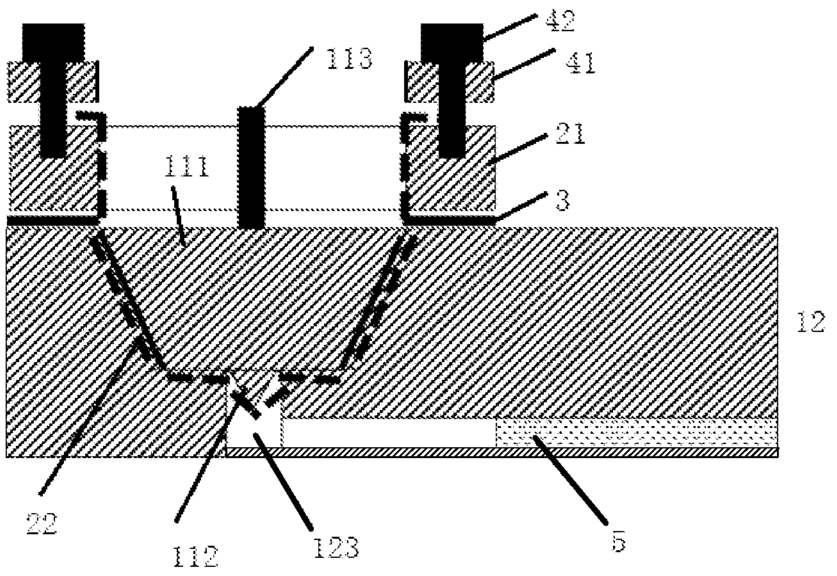
FIG. 6 is a schematic view of a using process of a device for liquid reagent storage and release according to an embodiment of the present disclosure.

Process 5: as shown in FIG. 6, the head portion 111 is pushed continually, to make the liquid reagent in the accommodating groove 122 gradually enter the liquid outlet channel 5 through the liquid outlet 123 under the squeezing of the head portion 111. Until the head portion 111 is fully received into the accommodating groove 122 and the needle tip portion 112 enters the liquid outlet 123, all of the liquid reagent is squeezed into the liquid outlet channel 5 through the liquid outlet 123, and the release of 300 microliters of the liquid reagent in the liquid reservoir portion 2 is completed.

In some cases, a small amount of liquid reagent may remain on the surface of the first thin film 23, the second thin film 24, the elastic film 22, the accommodating groove 122, or the puncturing portion 11, which results in the amount of the liquid reagent entering the liquid outlet 123 being slightly less than 300 microliters, wherein the total amount of residue is approximately 10 microliters.

Embodiments of the present disclosure also provide a microfluidic device that includes any one of the devices for reagent storage and release shown in FIGS. 1 to 6. For example, the microfluidic device may be a microfluidic chip.

The device for reagent storage and release according to the embodiments of the present disclosure is capable of long-termly storing a liquid biochemical reagent, and can quantitatively release the liquid reagent in the case that the liquid reagent is needed to be used. Whether body portion or liquid reservoir portion in the above device, they all can be modularly manufactured, which increases the flexibility of the microfluidic technique, especially the microfluidic chip, achieves a multipurpose chip, and reduces the cost of use.

Moreover, although example embodiments are described herein, the scope of the disclosure includes any or all embodiments based on the disclosure having equivalent elements, modifications, omissions, combinations (e.g., solutions by crossing the various embodiments), adaptations, or alterations. The elements in claims are to be construed broadly, based on the description in the claims and are not limited to the examples described in this specification or during the practice of the application, the examples are to be construed as non-exclusive. Therefore, it is intended that the specification and examples are considered as exemplary only, and a true scope and concept are indicated by the following claims and the full scope of equivalents of the claims.

The above description is illustrative but not restrictive. For example, the above-described examples (or one or more solutions thereof) may be used in combination with each other. Other embodiments may be used by such as one of ordinary skill in the art upon reviewing the above description. Also, in the above Detailed Description, various features may be grouped to simplify the present disclosure. This should not be interpreted as intentions that an unclaimed disclosed feature is essential to any claim. Rather, the subject of the present disclosure may include fewer features than all features of a specifically disclosed embodiment. Thus, the following claims are hereby incorporated into the Detailed Description as examples or embodiments, with each claim standing on its own as a separate embodiment, and it is contemplated that these embodiments may be combined in various combinations or permutations.

The scope of the present disclosure should be determined with reference to the appended claims, along with the full scope of equivalents of these claims. The above embodiments are merely exemplary embodiments of the present disclosure and are not intended to limit the disclosure, the scope of the present disclosure being defined by the claims. Those skilled in the art may, within the spirit and scope of the present disclosure, make various modifications or equivalent alterations to the disclosure, which may also be considered to be within the scope of the disclosure.

What is claimed is:

1. A device for reagent storage and release, comprising a body portion and a liquid reservoir portion, wherein the body portion comprises a puncturing portion and an accommodating portion that matches the puncturing portion, and the liquid reservoir portion is placed between the puncturing portion and the accommodating portion, wherein the accommodating portion is provided with an accommodating groove and a liquid outlet, the liquid outlet being at a bottom of the accommodating groove;

the puncturing portion is configured to puncture and pass through the liquid reservoir portion and then be received within the accommodating groove; and the liquid reservoir portion is configured to enable, upon being punctured, a liquid reagent in the liquid reservoir portion to flow into the accommodating groove.

2. The device according to claim 1, wherein the puncturing portion comprises a head portion and a needle tip portion, the needle tip portion being at a first end of the head portion.

3. The device according to claim 2, wherein the puncturing portion further comprises a push rod at a second end of the head portion, the second end of the head portion being opposite to the first end of the head portion.

4. The device according to claim 2, wherein the head portion is a tapered post, and a diameter of the first end of the head portion is smaller than a diameter of a second end of the head portion, the second end of the head portion being opposite to the first end of the head portion.

5. The device according to claim 2, wherein the accommodating portion is provided with a liquid outlet channel, wherein the liquid outlet is configured to communicate the liquid outlet channel with the accommodating groove.

6. The device according to claim 5, wherein an inner diameter of the liquid outlet is greater than a radial dimension of the needle tip portion.

7. The device according to claim 1, wherein the liquid reservoir portion is connected to the accommodating portion via a first connecting structure.

8. The device according to claim 7, wherein the first connection structure comprises an adhesive.

9. The device according to claim 1, wherein the liquid reservoir portion comprises a liquid reservoir body, an elastic film, a first thin film, and a second thin film; wherein the liquid reservoir body is annular, the first thin film is at one end of the liquid reservoir body, the second thin film is at the other end of the liquid reservoir body, and an enclosed liquid reservoir space is formed by an inner sidewall of the liquid reservoir body, the first thin film, and the second thin film; and the elastic film is disposed on one side, distal from the second thin film, of the first thin film and is connected to the liquid reservoir body.

10. The device according to claim 9, wherein an inner diameter of the liquid reservoir body is equal to an inner diameter of an opening of the accommodating groove.

11. The device according to claim 9, wherein the elastic film is connected to the liquid reservoir body via a second connecting structure.

12. The device according to claim 11, wherein the second connecting structure comprises a cover plate, wherein the cover plate is annular, disposed on one side, distal from the liquid reservoir body, of the elastic film, and is connected to the liquid reservoir body via a fastener, and the elastic film is sandwiched between the cover plate and the liquid reservoir body.

13. The device according to claim 9, wherein the elastic film is a silicone film.

14. The device according to claim 9, wherein the first thin film and the second thin film are both a composite film of polystyrene and aluminum.

15. A microfluidic device comprising a device for reagent storage and release, wherein the device for reagent storage and release comprises a body portion and a liquid reservoir portion, wherein the body portion comprises a puncturing portion and an accommodating portion that matches the puncturing portion, and the liquid reservoir portion is placed between the puncturing portion and the accommodating portion, wherein the accommodating portion is provided with an accommodating groove and a liquid outlet, the liquid outlet being at a bottom of the accommodating groove, the puncturing portion is configured to puncture and pass through the liquid reservoir portion and then be received within the accommodating groove; and the liquid reservoir portion is configured to enable, upon being punctured, a liquid reagent in the liquid reservoir portion to flow into the accommodating groove.

16. The device according to claim 15, wherein the puncturing portion comprises a head portion and a needle tip portion, the needle tip portion being at a first end of the head portion.

17. The device according to claim 16, wherein the puncturing portion further comprises a push rod at a second end of the head portion, the second end of the head portion being opposite to the first end of the head portion.

18. The device according to claim 16, wherein the head portion is a tapered post, and a diameter of the first end of the head portion is smaller than a diameter of a second end of the head portion, the second end of the head portion being opposite to the first end of the head portion.

19. The device according to claim 16, wherein the accommodating portion is provided with a liquid outlet channel, wherein the liquid outlet is configured to communicate the liquid outlet channel with the accommodating groove.

20. The device according to claim 19, wherein an inner diameter of the liquid outlet is greater than a radial dimension of the needle tip portion.

* * * * *